United States Patent [19]

Clonch et al.

[11] Patent Number: 5,107,913
[45] Date of Patent: Apr. 28, 1992

[54] INDUSTRIAL SOLID TIRES

[75] Inventors: David M. Clonch, Bristol, Va.; George H. Nybakken, Middlebury; Richard L. Palinkas, Northfield, both of Conn.

[73] Assignee: Simmons-Rand Company, Bristol, Va.

[21] Appl. No.: 676,743

[22] Filed: Mar. 28, 1991

[51] Int. Cl.⁵ ............................................. B60C 7/00
[52] U.S. Cl. ...................................... 152/323; 152/324
[58] Field of Search ................. 301/63 PW; 152/323, 152/1, 5, 7, 324, 326

[56] References Cited

U.S. PATENT DOCUMENTS

| | | | |
|---|---|---|---|
| 1,268,437 | 6/1918 | Clough | 152/324 |
| 1,360,907 | 11/1920 | Ernenwein | 152/324 |
| 1,382,630 | 6/1921 | Davis | 152/324 |
| 1,405,972 | 2/1922 | Dalton | 152/323 |
| 1,427,331 | 8/1922 | Sherwood | 152/324 |
| 1,645,089 | 10/1927 | Burdette | 152/323 |
| 1,697,439 | 1/1929 | Wagonhorst | 152/326 X |
| 1,707,815 | 4/1929 | Robb | 152/323 |
| 3,179,148 | 4/1965 | Chapman | 152/310 |
| 4,590,980 | 5/1986 | Kuhn | 152/323 |

FOREIGN PATENT DOCUMENTS

| | | | |
|---|---|---|---|
| 157283 | 8/1953 | Australia | 152/324 |
| 597169 | 5/1934 | Fed. Rep. of Germany | 152/324 |
| 2201980 | 5/1974 | France | 152/323 |

OTHER PUBLICATIONS

Industrial Tires Unlimited Brochure, p. 6.

*Primary Examiner*—Russell D. Stormer
*Attorney, Agent, or Firm*—John J. Selko; David W. Tibbott

[57] ABSTRACT

A wheel for a relatively slow vehicle used in industrial applications and incorporating a solid tire formed of dense elastomer material such as cast polyurethane, having a relatively large radial depth, for example six inches, a relatively large width, for example twelve inches, and a deep slot extending circumferentially around the tire and dividing the tire into sections separated by the slot with the ratio of the depth of the slot to the lateral width of each section being in the range of 0.65 to 1.75. The tire is bonded to the wheel rim and includes sidewalls containing concave surfaces terminating in relatively thin lips bonded to the outer edges of the rim, keeping stress in the edge of the tire relatively low which helps reduce tire failures from beginning in the edges of the tire along the rim edges.

8 Claims, 4 Drawing Sheets

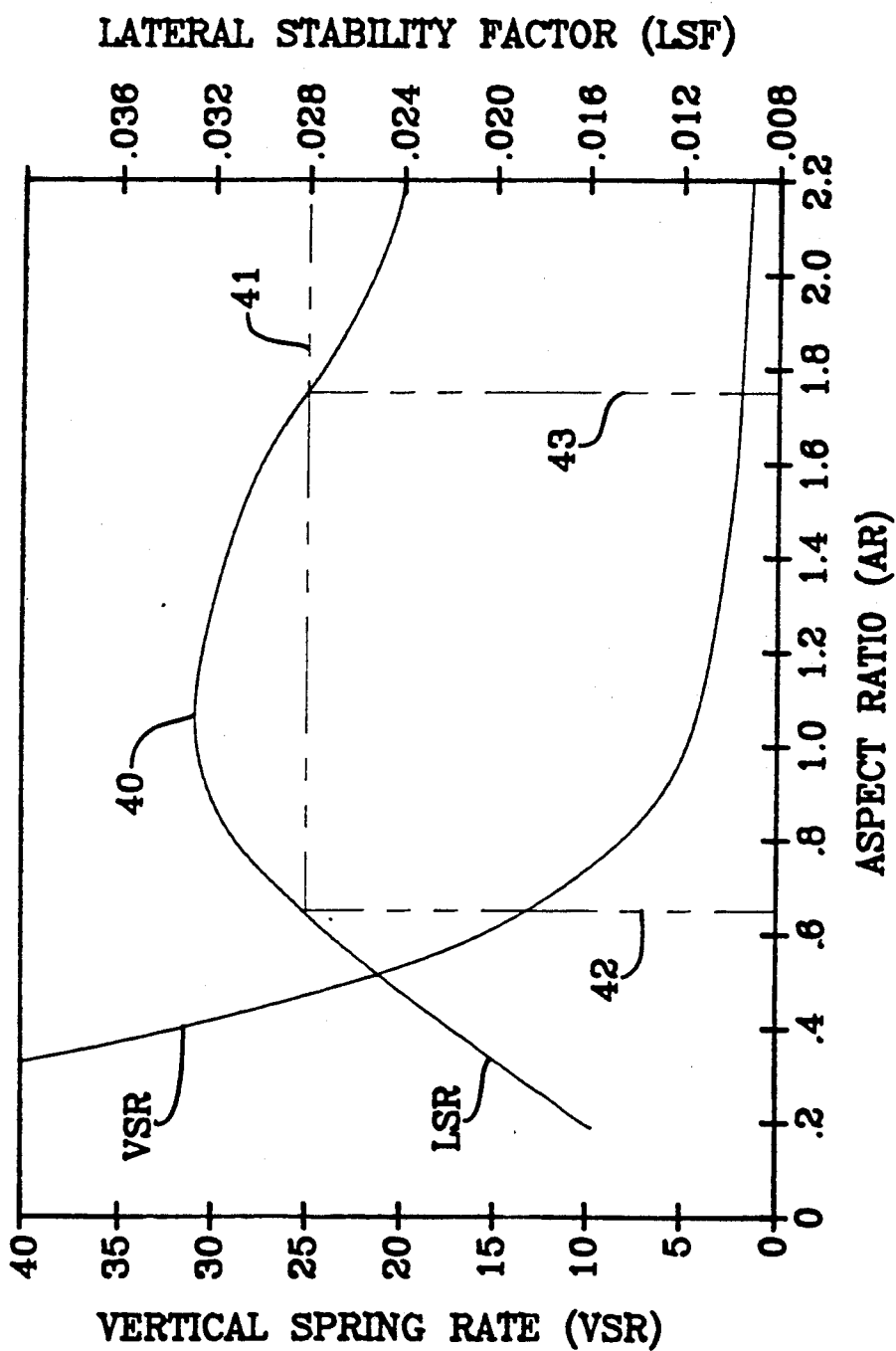

5,107,913

INDUSTRIAL SOLID TIRES

BACKGROUND OF THE INVENTION

This invention relates to solid tires made of elastomeric material used in industrial applications and more particularly to improved solid tires able to carry extreme loads while providing a reasonably satisfactory ride for vehicle occupants.

Conventional solid tires on the market today generally are used for slow-speed industrial applications that require the tire to have properties such as being puncture-proof, able to carry relatively heavy loads, and having good resistance to wear and tear. The ride provided to occupants of vehicles using such tires generally is satisfactory when the vehicles are operated on smooth surfaces, such as forklift trucks operated on paved or concrete surfaces in a warehouse. However, the ride provided by solid tires presents a major problem to occupants of vehicles used on broken and uneven surfaces, such as typically found in mills, mines, quarries and the like. At some point the discomfort caused by a poor vehicle ride can cause injury to a vehicle occupant; furthermore, a customer for a tire of this type is going to refuse to buy the tire long before the ride becomes so bad that it causes injury. This unsatisfactory ride problem further increases in tires made to withstand unusually heavy loads.

The load capacity of a solid tire can be raised in at least two ways, (1) by increasing the area of tire surface engaging the ground and, (2) increasing the spring rate of the tire. The surface area of the tire engaging the ground can be increased by increasing either or both the diameter or the width of the tire, both of which have limits caused by vehicle design. Increasing the spring rate of the tire causes the ride harshness to rise, thus, also limiting the tire designer in achieving an increased load capacity for a solid tire.

The foregoing illustrates limitations known to exist in conventional solid tires. It is apparent that it would be advantageous to provide an alternative directed to overcoming one or more of the limitations set forth above. Accordingly, a suitable alternative is provided including features more fully discussed hereinafter.

SUMMARY OF THE INVENTION

In one aspect of the invention, this is accomplished by providing a wheel incorporating a solid tire for relatively slow speed operation for use in industrial applications and comprising an inner circular wheel core adapted to be mounted on a vehicle and having a circular rim adapted to carry a tire; a solid tire formed of an elastomer mounted on said rim and having a radial depth of at least three inches and a width in the axial direction of said wheel of at least double said radial depth, said tire including at least one slot circling the periphery of said tire and dividing said tire into at least two annular sections separated by said slot, said slot having a depth of at least two thirds of the radial depth of said tire, and the ratio of the depth of said slot to the axial width of at least one of said annular sections being in the range of 0.65 to 1.75.

BRIEF DESCRIPTION OF THE DRAWING

FIG. 4 is a graph showing two curves, each plotted against separate vertical coordinates and a common horizontal coordinate, illustrating the preferred selection of dimensions for the bending sections of the tire included in this invention.

DETAILED DESCRIPTION

Figure 1:
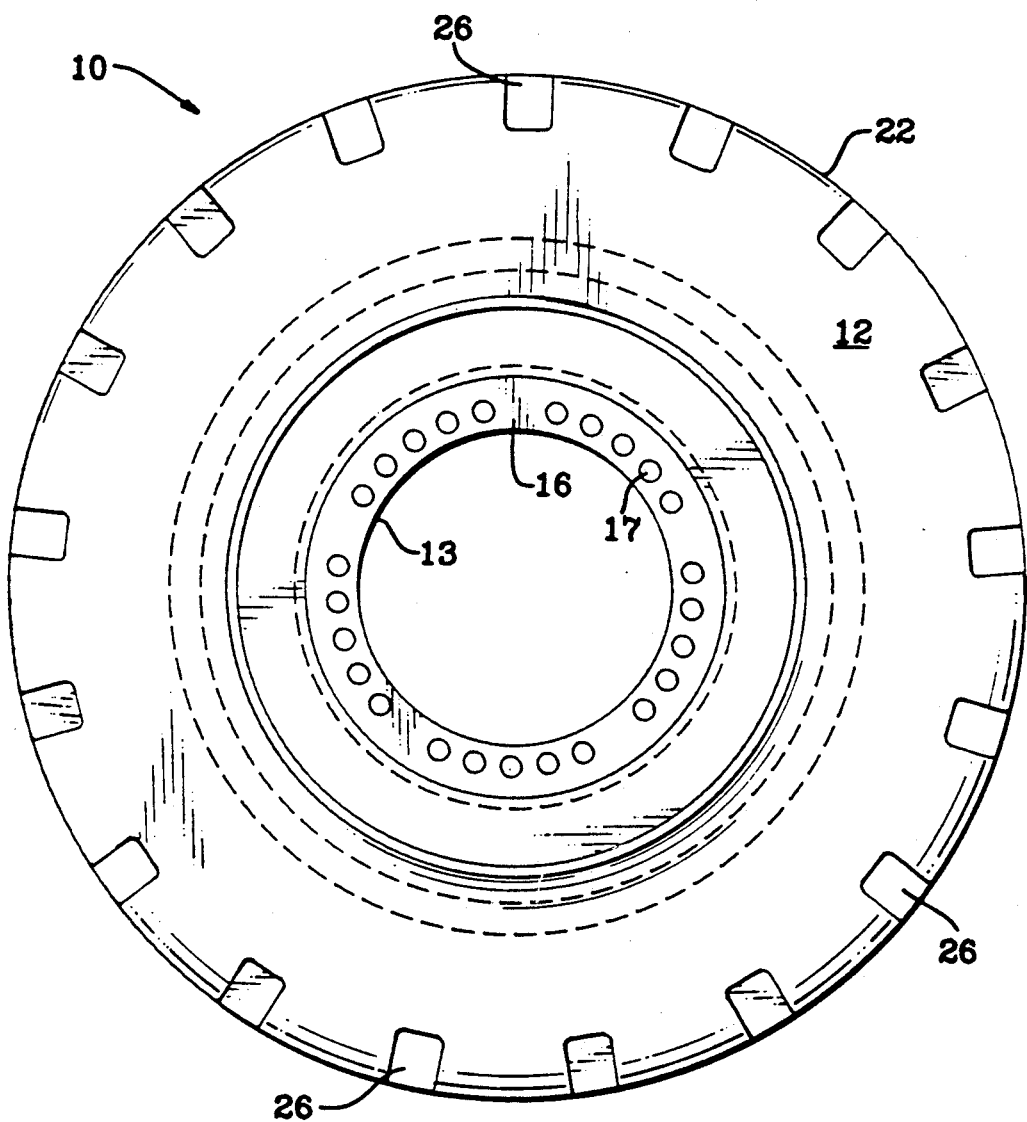
FIG. 1 is a face view of a wheel incorporating the improved solid tire.

The wheel 10 shown in the drawings generally includes a circular rim 11 carrying on its outer surface a solid tire 12 circling the rim 11 and having on the inside of the rim 11 a front hub 13 and a rear hub 14 welded or otherwise joined to respective front and rear edges of the rim 11 and extending around its interior. The front hub 13 further includes a thicker outer section 15 and a thinner inner section 16 joined to the outer section 15 and carrying a series of mounting holes 17 circularly spaced around it adjacent its inner periphery for receiving fasteners used to mount the wheel on the mounting flange of a spindle or axle of a vehicle. The outer peripheral edges of both the front and rear hubs 13 and 14 carry beveled edges 18 smoothly joining with the outer periphery 19 of the rim 11. Both the outer periphery 19 and the two beveled edges 18 form the surface carrying the tire 12.

The solid tire 12 is an elastomer material which is both tough and resilient and will provide maximum load carrying capacity, long term durability and a good ride for the vehicle. Specific material that can be used by this invention will be discussed later. In one form of the invention, the elastomer tire is cast on the periphery 19 of the rim 11 in a manner such that the tire is attached to the surface 19 sufficiently to prevent the tire 12 from sliding (rotating) on the rim 11 during use. As illustrated in the drawings, the tire 12 includes an outer periphery or tread face 22, spaced sidewalls 23 and 24, and an inner periphery 25, engaging the periphery 19 of the rim 11. The tread face 22 of the tire 12 is illustrated as containing a rudimentary tread in the form of circumferentially spaced grooves 26 extending laterally inward from the sidewalls 23 and 24 and ending about halfway across the tread face 22, with the tread grooves 26 opening on opposite sidewalls 23 and 24 being circumferentially offset from each other. The depth of the tread grooves 26 is about as deep as the usual tread in a tire.

Figure 2:
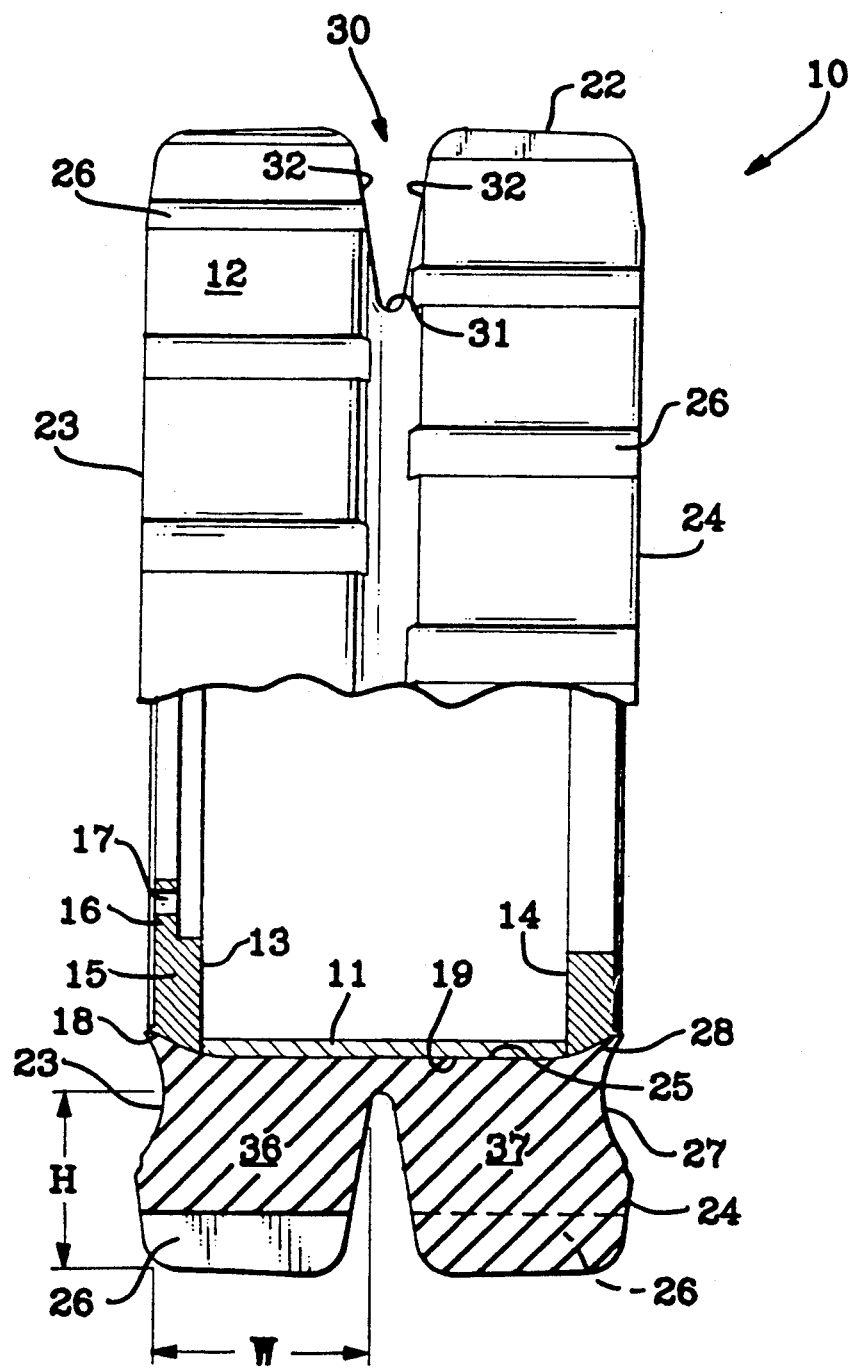
FIG. 2 is a view looking at the wheel from the tread face of the solid tire with a portion of the wheel and tire cut away to show the tire in cross section.

Each of the sidewalls 23 and 24 of the tire 12, as shown in FIG. 2, has its inner two thirds, measured radially, formed as a concave surface 27 terminating at the inner diameter of the tire 12. The inner periphery 25 of the tire 12, seated on the outer surface 19 of the rim 11, extends outwardly over the beveled edges 18, and forms with the concave surface 27 a relatively thin lip 28 circling the inner diameter of the tire 12. Making the lip 28 thin lowers the stresses in this part of the tire making it less likely to fail in this area.

In order to achieve the high load carrying capacity required in some applications, using known materials, it has been found necessary to make the tire 12 quite wide, for example, up to 18 inches wide. Unfortunately, a tire this wide has been found to provide a very rough ride. It has been discovered that the ride is substantially improved by providing the tire 12 with a groove 30 circling the periphery 23 of the tire 12 and having a bottom 31 and a pair of laterally spaced walls 32. The groove 30 divides the width of the outer periphery 22 into at least two sections 36 and 37, each acting as a separate supporting surface. The depth of the groove 30 may extend to the periphery 19 of the rim 11, although it has been found unnecessary as long as the depth of the groove 30 is substantial, say, at least 0.7 of the depth of the tire 12. In fact, it may be undesirable to make the groove 30 extend entirely to the periphery 19 of the rim 11 because it would leave the surface of the rim 11 unprotected from corrosion or the like.

As illustrated in FIG. 2, the cross section of each section 36 and 37, formed by the use of the groove 30, has a height H measured from the level of the groove bottom 31 to the top of the tread face 22 and a width W measured from a slot wall 32 in the groove 30 to the outside of the tire 12, near the bottom of the slot 30. The ratio of the section height H divided by the section width W is called the section aspect ratio AR and has been found to be important in designing a tire using the groove 30 to control the ride of the tire 12. It has been found preferable for the aspect ratio AR to be in the range of 0.65 to 1.75 with the most desirable range being 0.9 to 1.2.

It is believed that this improved ride is achieved because the sections 36 and 37 of the tire 12 are bending, either inwardly or outwardly, under load allowing the tire 12 to deflect in the vertical direction as it rolls over the ground. In a pneumatic tire, this deflection would take place by the tire deforming cross sectionally (the tire cavity deforms) as it rolls, but this sort of deflection does not occur in a solid tire because there is no cavity. In the past the only deflection occurring in a solid tire was the compression and expansion (more accurately called material deformation) of the tire material. The provision of the slot 30 divides the tire 12 into the sections 36 and 37 which are allowed to bend in either direction under load to allow additional vertical deflection serving to improve the ride.

Figure 3:
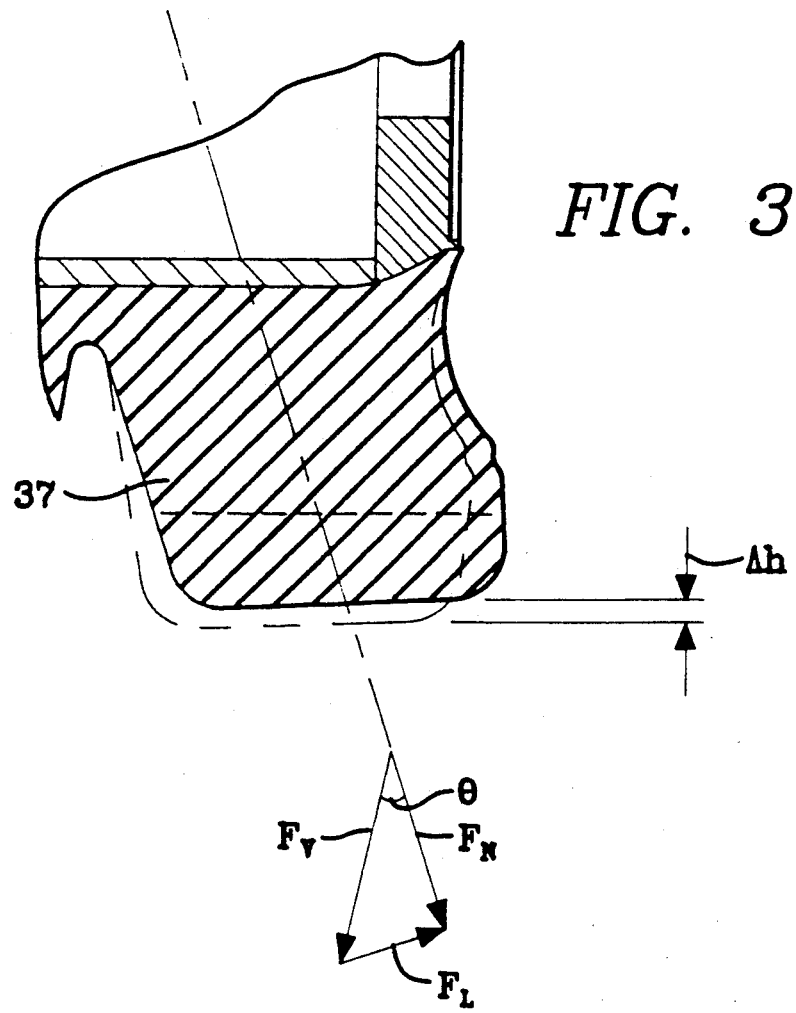
FIG. 3 is a diagram of a cross section of the solid tire illustrating the bending of a tire section under a vertical load on the wheel.

This bending of the sections 36 and 37 is illustrated in FIG. 3, showing a section 37 bending, caused by the vertical load on the tire. FIG. 3 also illustrates the vertical deflection resulting from the bending of the tire sections 36 and 37, shown as Δ h. In theory, if the tire was positioned in a vertical plane and there was no sidewise force on it, the application of a vertical downward force or load on the tire would not cause the tire sections 36 and 37 to bend; instead, the vertical load on the tire would result only in the tire material being compressed (deformed) in the area of the surface of the tire engaging the ground. However, as the vertical load on the tire increases, the slightest side force can cause the tire sections 36 and 37 to begin bending; such side forces are always present on a rolling tire. Once the tire sections 36 and 37 are no longer orientated purely vertical, the amount of bending of the tire sections 36 and 37 is related to the vertical load on the tire, i.e. bending increases as the load increases. This bending is directly caused by a lateral force related to the vertical force and applied to the tire section in generally the lateral direction. This lateral force can be measured and is related to the ride of the tire. FIG. 3 illustrates a force triangle diagram showing the vertical load $F_V$, the normal force component $F_N$ and the lateral force component $F_L$, acting on the tire section with the acute angle $\theta$ of the triangle being the amount of the bending of the tire section measured in degrees.

FIG. 4 illustrates the relationship between the aspect ratio AR of the tire 12 and two other qualities of the tire which are termed vertical spring rate VSR and lateral stability factor LSF. The vertical spring rate VSR is the vertical load on a tire section divided by the amount of vertical deflection resulting purely from the compression of the tire material and is sometimes called the vertical stiffness of the tire (the force necessary to overcome the ability of the tire to resist vertical deflection). The vertical spring rate VSR varies generally inversely to the ride of the tire and is measured in pounds per inch (vertical deflection of the tire resulting from compression of the tire material).

The lateral stability factor LSF is a measurement of the lateral spring rate LSR (sometimes called lateral stiffness) of one of the tire sections 36 or 37, causing such section to bend, divided by the amount of VSR of the tire section. It may be easier to understand this term "lateral spring rate" if one thinks of it as the force required to overcome the resistance of the tire section to bending in the lateral direction over a given amount of deflection. The lateral spring rate LSR can be calculated by a complicated formula including the modulus of elasticity of the tire material, a function of the tire radius and a function of the width of the tire. However, the understanding of this invention is not believed to require an explanation of this formula.

Ideally, the vertical spring rate VSR of the tire should be as low as possible to provide a good ride, without the tire being unstable and while the tire 12 is able to carry its load without overheating to the point of failure. It is believed that the lateral stability factor LSF should remain in the high portion of its curve near its peak 40 because as the aspect ratio AR increases (moves to the right of the peak 40 in FIG. 4) the lateral spring rate LSR of the tire section falls to the point where the tire section can no longer resist either folding over completely or bending to the point where the tire rapidly overheats and fails. On the other hand, if the lateral stability factor LSF moves to the left of the peak 40, the vertical spring rate VSR soon becomes so large that the ride of the tire is much too hard. On the basis of the knowledge now known about this invention, it is believed that the aspect ratio AR of the sections 36 and 37 should be in the part of the lateral stability factor LSF curve at or above 87.5% of maximum value (peak 40), which results in the preferred range of aspect indicates the 87.5% points on the curve LSF and the vertical lines 42 and 43 indicate the ends of the AR range of 0.65 to 1.75. In addition it is believed that the best ride is provided in the aspect ratio AR range of 0.9 to 1.2.

Elastomers having the properties useful for making the tire 12 can come from the material group including natural rubber, nitrile rubber, styrene butadiene rubber, cis-butadiene rubber, thermoplastic rubber, and polyurethane. The important aspect of all of these elastomers is having the following properties:

| Property | Measurement Range |
|---|---|
| 1. Hardness, using ASTM-D224 | 50A–95A |
| 2. Tear, using ASTM-D470 (pounds/linear inch) | 30 PLI* Minimum |
| 3. Hysteresis (tan δ degrees @ 100° C.), using ASTM-2235, Rheometrics, | 0.10 Maximum |

| Property | Measurement Range |
| --- | --- |
| 4. Elongation, using ASTM-D412 | 200%-800% |

*PLI = pounds/linear inch

Although all of the foregoing materials are useful, it has been found that cast polyurethane is preferred because it offers the best qualities of load carrying capacity, toughness and resilience. Polyurethane offers the following properties:

| Property | Measurement Range |
| --- | --- |
| 1. Hardness | 65A-75A |
| 2. Tear (PLI*) | 50 Minimum |
| 3. Hysteresis (tan δ) | 0.04 Maximum |
| 4. Elongation (%) | 600-800 |

When casting the polyurethane on the rim 11, it is useful to coat the periphery 19 of the rim 11 with a good bonding agent such as Lord's Chemlock 213 or 218, or Morton International's Thixon 405 or 406 to insure a satisfactory bond between the polyurethane and the rim surface 19. The use of the relatively thin lips 28 along with the bonding agent serves to reduce the stress on the bond along the inner edge of the tire 12 which otherwise is likely to be the place where failures of the tire 12 are likely to begin.

Figure 5:
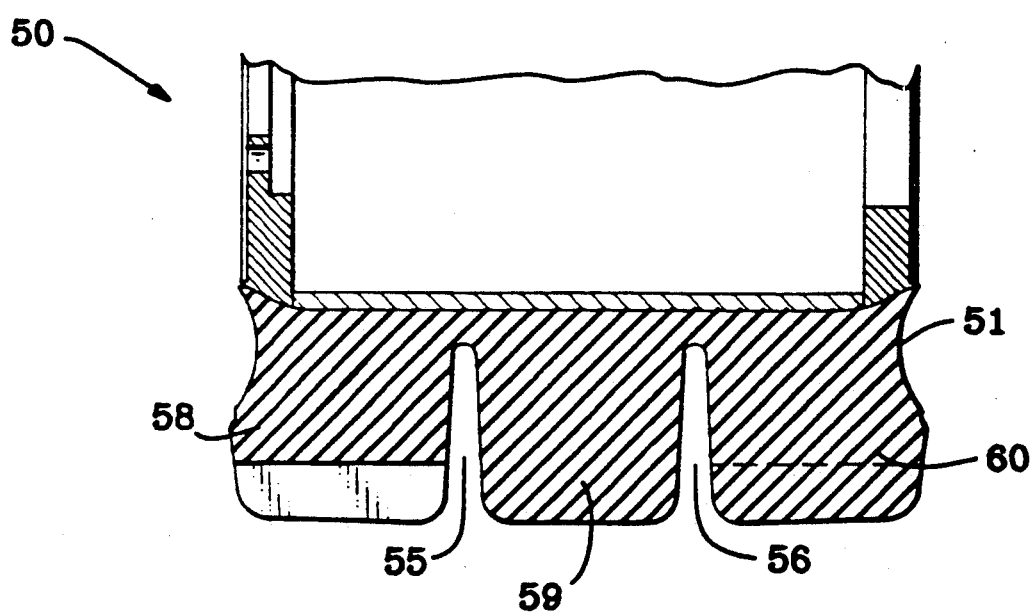
FIG. 5 is a view similar to FIG. 2 with the exception of being cut away to show the lower half of another embodiment having a pair of annular slots formed in the tire.

Another embodiment of a wheel 50 is illustrated in FIG. 5 including a tire 51 containing two annular slots 55 and 56 dividing the tire 51 into three sections 58, 59 and 60. This tire may be about 18 inches wide. This embodiment illustrates the possibility of the tire having more than one slots.

An example of a satisfactory tire incorporating the principles of this invention includes the following dimensions and specifications:

| | |
| --- | --- |
| Material | Cast polyurethane having a hardness of 70 shore A, cast at atmospheric pressure using standard molding processes. |
| rim bonding | Lord's Chemlock 213 |
| tire outer diameter | 32 inches |
| rim outer diameter | 20 inches |
| tire width | 13.58 inches |
| rim width | 12.94 inches |
| tire depth | 6 inches |
| slot depth | 5.70 inches |
| tread depth | 1.75 inches |
| section width W | about 6 inches (depends on place of measurement) |
| section height H | 5.70 inches |
| aspect ratio AR | .95 |

It should be noted that the aspect ratio of this tire example is within the most preferred range of 0.9 to 1.2.

While this invention has been illustrated and described in accordance with a preferred embodiment, it is recognized that variations and changes may be made therein without departing from the invention as set forth in the claims.

Having described the invention, what is claimed is:

1. A wheel incorporating a solid tire for relatively slow speed operation for use in industrial applications comprising:
   an inner circular wheel core adapted to be mounted on a vehicle and having a circular rim adapted to carry a tire;
   a solid tire formed of an elastomer selected from the group consisting essentially of natural rubber, nitrile rubber, styrene butadiene rubber, cis-butadiene rubber, thermoplastic rubber and polyurethane, said tire mounted on said rim, said tire having a radial depth and a width in the axial direction of said wheel and including at least one slot circling the periphery of said tire and dividing said tire into at least two annular sections separated by said slot, said slot having a depth of at least two thirds of the radial depth of said tire, each of said annular sections characterized by having an aspect ratio in the range of about 0.65 to 1.75, a vertical spring rate in the range of about 2.0 to 14.0 and a lateral stability factor in the range of about 0.028 to 0.033.

2. The wheel of claim 1 wherein said aspect ratio is in the range of 0.9 to 1.2.

3. The wheel of claim 1 wherein said tire is made of cast polyurethane.

4. The wheel of claim 1 wherein said radial depth is at least six inches.

5. The wheel of claim 1 wherein the width of said tire is at least twelve inches.

6. The wheel of claim 1 wherein the hardness of said elastomer is in the range of 50 A to 95 A using ASTM-D224.

7. The wheel of claim 1 wherein said rim along its inner and outer edges includes inwardly beveled surfaces receiving the inner edges of the tire and the tire includes sidewalls which are concave in a radial direction and terminate on the inner edges of the tire in relatively thin lips overlying and seated on the beveled surfaces.

8. The wheel of claim 1 wherein said tire is polyurethane material cast on the rim with a bonding agent coated on the rim prior to the casting of the polyurethane material.

* * * * *